(12) United States Patent
Kim et al.

(10) Patent No.: US 12,227,376 B2
(45) Date of Patent: Feb. 18, 2025

(54) WITHDRAWAL SYSTEM FOR WITHDRAWING ARTICLE FROM PACKAGING BOX

(71) Applicant: CJ CHEILJEDANG CORPORATION, Seoul (KR)

(72) Inventors: Myung Ho Kim, Jincheon-eup (KR); Sung Woo Park, Jincheon-eup (KR); Bong Yong Sung, Gimhae-si (KR); Hee Dong Son, Changwon-si (KR); Dae Hwa Kim, Osan-si (KR); Sun Kyu Kim, Hwaseong-si (KR); Soo Hyun Kim, Gimpo-si (KR); Hak Dong Kim, Suwon-si (KR); In Soo Jung, Suwon-si (KR)

(73) Assignee: CJ CHEILJEDANG CORPORATION, Seoul (KR)

( * ) Notice: Subject to any disclaimer, the term of this patent is extended or adjusted under 35 U.S.C. 154(b) by 308 days.

(21) Appl. No.: 17/801,226

(22) PCT Filed: Feb. 19, 2021

(86) PCT No.: PCT/KR2021/002135
§ 371 (c)(1),
(2) Date: Aug. 19, 2022

(87) PCT Pub. No.: WO2021/167406
PCT Pub. Date: Aug. 26, 2021

(65) Prior Publication Data
US 2022/0411205 A1 Dec. 29, 2022

(30) Foreign Application Priority Data
Feb. 19, 2020 (KR) .................. 10-2020-0020684

(51) Int. Cl.
*B65G 65/23* (2006.01)
*B65G 47/252* (2006.01)
*B65G 47/91* (2006.01)

(52) U.S. Cl.
CPC .......... *B65G 65/23* (2013.01); *B65G 47/252* (2013.01); *B65G 47/914* (2013.01); *B65G 2814/0317* (2013.01)

(58) Field of Classification Search
CPC .................. B65G 47/252; B65G 65/23; B65G 2814/0317
(Continued)

(56) References Cited

U.S. PATENT DOCUMENTS 2,865,516 A * 12/1958 Hedderich ............. B22D 33/02
414/766
3,812,982 A * 5/1974 Crandlemire .......... B65G 65/00
414/771
(Continued)

FOREIGN PATENT DOCUMENTS

JP S61140445 A 6/1986
JP H05254525 A 10/1993
(Continued)

OTHER PUBLICATIONS

International Search Report and Written Opinion issued in International Application PCT/KR2021/002135, issued May 7, 2021, 6 pages.

(Continued)

*Primary Examiner* — James Keenan
(74) *Attorney, Agent, or Firm* — DILWORTH IP, LLC

(57) ABSTRACT

An article withdrawing system for withdrawing articles held in a packing box, the upper surface of which is opened. A first stage holds the packing box carried with the opened upper surface and reverses the packing box so that the (Continued)

articles held in the packing box falls down. A second stage supports and holds the falling-down articles. The first stage includes a support unit supporting and moving the packing box upward and downward, a box holding frame in which the support unit is mounted, a linear movement frame to which the box holding frame is rotatably coupled, a main frame in which the linear movement frame is coupled and supported to be linearly moved and is located and supported on the ground, and a first rotation driving mechanism disposed in the linear movement frame and for rotating and driving the box holding frame.

5 Claims, 5 Drawing Sheets

(58) Field of Classification Search
USPC .................. 414/405, 758, 766, 767, 771
See application file for complete search history.

(56) References Cited

U.S. PATENT DOCUMENTS

| | | | |
|---|---|---|---|
| 4,232,782 A | | 11/1980 | Keda et al. |
| 5,360,309 A | * | 11/1994 | Ishiguro ................... B08B 9/42 |
| | | | 414/766 |
| 6,139,243 A | * | 10/2000 | Jackson ............ H01L 21/67333 |
| | | | 414/811 |
| 6,238,164 B1 | * | 5/2001 | Isaacs ..................... B07C 3/008 |
| | | | 414/405 |
| 6,398,008 B1 | * | 6/2002 | Suga ....................... B65B 69/00 |
| | | | 198/408 |
| 6,722,841 B2 | * | 4/2004 | Haas ......................... B66F 9/18 |
| | | | 414/421 |
| 7,553,119 B2 | * | 6/2009 | Good ....................... B07C 3/02 |
| | | | 414/404 |

FOREIGN PATENT DOCUMENTS

| | | |
|---|---|---|
| JP | H07149427 A | 6/1995 |
| JP | H0912133 A | 1/1997 |
| JP | 2018076176 A | 5/2018 |
| KR | 10-1527654 B1 | 6/2015 |
| KR | 10-1554009 B1 | 9/2015 |
| KR | 101902814 B1 | 10/2018 |
| KR | 102137935 B1 | 7/2020 |

OTHER PUBLICATIONS

Extended European Search Report issued in European Patent Application No. 21757585.1, mailed Aug. 10, 2023.

* cited by examiner

WITHDRAWAL SYSTEM FOR WITHDRAWING ARTICLE FROM PACKAGING BOX

FIELD OF THE INVENTION

The present disclosure relates to a system for withdrawing articles from a packing box, and more particularly, to a system for withdrawing articles from a packing box, by which heavy articles held in the packing box having the opened upper surface are withdrawn.

BACKGROUND OF THE INVENTION

As a packing container for carrying and storing articles, a box having a cuboidal form is widely used.

FIG. 1 illustrates a packing box of a widely used form.

A packing box 1 is mainly made of a paper panel coated with a synthetic resin film, and is closed by four panels in which top and bottom surfaces of the packing box extend from side surfaces.

Since the top and bottom surfaces of the packing box have the same structure, the upper surface will be described with reference to FIG. 1. The four panels 2 to 5 are made in two pairs, are folded from edges of the side surfaces to close the upper surface when ends of the four panels are abutted upon or adjacent to each other. A pair of panels 4 and 5 are folded in a faced state, and then the other pair of panels 2 and 3 are folded in a faced state, and are placed in an orientation perpendicular to the pair of panels 4 and 5 folded in advance.

In this manner, the upper surface of the packing box is closed, and the mutually abutting ends of the first pair of panels 2 and 3 folded and placed above are coupled to each other with an adhesive tape, and are closed to prevent the packing box 1 from being opened by an external force.

After the packing box 1 is first configured to close the bottom surface in the same mode as the upper surface, and then articles are put from the upper surface of the packing box 1 and are held in the inner portion of the packing box 1, the panels 4,5 forming the top surface are folded as described above, the ends of the pair of panels 2 and 3 are coupled by an adhesive tape, thereby closing the packing box 1. The closed packing box 1 is carried.

Meanwhile, when an attempt is made to open the packing box 1, which is configured in this manner and contains articles, and then to take out the articles, the adhesive tape mutually coupling the panels 2 and 3 is cut, and then the panels 2 to 5 are all unfolded outward to open the upper surface. Then, the articles held in the inner portion of the packing box 1 are taken out.

In a case where the articles held in the packing box 1 are general consumer goods, there is no special problem. However, in a case of the articles used at a mass production manufacturing factory, an operation of aligning and carrying the articles in a given direction in order to take out the articles from the packing box 1 and then put the articles into the manufacturing factory is a job requiring a lot of labor force in spite of a very simple operation, and becomes a cause of increasing manufacturing costs.

Especially, in a case where the articles held in the packing box 1 are heavy in weight and are easily damaged, an immoderate force is applied to the body of a worker in a process in which the worker withdraws the articles, and thus the worker may lead to industrial accident. Particularly, there may occur a situation where the article falls to the ground and is broken because the worker does not cope with the weight of the article while withdrawing the article.

Meanwhile, an invention titled "Packing box having window structure for withdrawing stick cake goods" is disclosed in Korean Patent Publication No. 10-1554009 (Document 1). The packing box according to Document 1 suggests a configuration that making it easier to draw the goods held in the packing box.

However, the packing box according to the invention of Document 1 merely discloses a configuration in which a consumer stores the articles in the packing box and makes it convenient to draw the articles one by one if necessary, but does not suggest a configuration suitable to draw the articles from the packing box required at a mass production manufacturing factory.

Further, an invention titled "Packing box for easily withdrawing products" is disclosed in Korean Patent Publication No. 10-1527654 (Document 2). The packing box according to the invention of Document 2 suggests a structure of easily withdrawing the articles.

However, the packing box of this Document 2 merely facilitates operations of opening the packing box and withdrawing of the articles, and does not suggest a configuration or a device for automating the withdrawing operation.

As described above, the prior arts suggest a technique of making it easy to draw the articles held in the packing box, and such packing box has a special form of making the withdrawing easy. However, in the prior arts, there is neither disclosure nor consideration for a system that makes it possible to automatically draw products, which are heavy in weight or are easily damaged, from a packing box having a general configuration.

SUMMARY OF THE INVENTION

Technical Problem

The present disclosure is directed to provide a system for withdrawing articles from a packing box.

To be specific, the present disclosure is directed to provide a system for automatically withdrawing articles from a packing box, an upper surface of which is opened.

Further, the present disclosure is directed to provide a withdrawing system having a configuration where, when articles held in a packing box is heavy in weight and is easily damaged, the articles are allowed to be drawn without being damaged by a fall, a shock, etc. while not using a force of a person in a process of withdrawing the articles.

Technical Solution

According to the present disclosure for realizing at least one of the aforementioned objects, provided is an article withdrawing system configured to withdraw articles held in a packing box, the upper surface of which is opened.

The article withdrawing system of the present disclosure includes:
  a first stage configured to hold a packing box carried with an upper surface thereof opened and to reverse the packing box such that articles held in the packing box are allowed to fall down; and a second stage configured to support and hold the articles falling down from the first stage.

The first stage may include a support unit configured to support and move the packing box upward and downward, a box holding frame on which the support unit is mounted, a linear motion frame to which the box holding frame is rotatably coupled, a main frame located and supported on the ground, with the linear motion frame being coupled to and supported on the main frame so to be linearly movable, and a first rotation drive means disposed on the linear motion frame and for rotatably driving the box holding frame.

The second stage may include an article holding frame that has a holding surface having a shape complemented by a shape of the article so as to hold the article falling down from the first stage, a fixed frame located and supported on the ground, with the article holding frame being rotatably coupled to the fixing frame, and a second rotation drive means for rotating the article holding frame relative to the fixed frame.

When the packing box in which the articles are contained is seated on the support unit of the first stage, the article holding frame of the second stage may be rotated relative to the fixed frame such that the holding surface is faced downward.

The packing box may be raised by the support unit such that the upper surface of the packing box comes close to or be in contact with the holding surface after the linear motion frame of the first stage is linearly moved such that the opened upper surface of the packing box faces the holding surface of the article holding frame.

The box holding frame of the first stage and the article holding frame of the second stage may be respectively rotated relative to the linear motion frame and the main frame in a state where the upper surface of the packing box comes close to or is in contact with the holding surface, so that a position of the packing box is reversed and so that the articles held in the packing box fall to be held in the holding frame.

An operation of the article withdrawing system of the present disclosure according to this configuration will be described.

The box holding frame of the first stage is separated from the article holding frame of the second stage. In this state, the articles are held in the box holding frame of the first stage, and the packing box having the opened upper surface is placed therein.

Subsequently, the article holding frame of the second stage is rotated relative to the fixed frame such that the holding surface faces the bottom side, and the linear motion frame is linearly moved relative to the main frame on the first stage so that the box holding frame is placed below the article holding frame. Accordingly, the opened upper surface of the packing box is caused to face the holding surface of the article holding frame of the first stage.

In this state, the packing box is raised by the support unit so that the opened top surface of the packing box approximates or abutted against the holding surface. Then, the box holding frame of the first stage and the article holding frame of the second stage are respectively rotated relative to the linear motion frame and the main frame, so that the position of the packing box is inversed, the articles held in the packing box fall to be held in the article holding frame.

Accordingly, the articles deviate from the packing box, and are held on the holding surface of the article holding frame. Subsequently, the support unit is moved up or down with the packing box supported, moves back from the holding surface of the article holding frame, and returns to an initial state.

As described above, the articles are withdrawn from the packing box, and each of the packing box and the article are carried to a place to be used or a waste place by separate carrying units.

As a specific embodiment aspect of the article withdrawing system of the present disclosure, in the article withdrawing system of the present disclosure, The support unit of the first stage may include: a first plate configured to support a bottom surface of the packing box; first actuators configured to actuate the first place to move up or down; two second plates configured to compress and support opposite sides of the packing box at opposite sides of a rotation axis of the box holding frame, respectively; second actuators configured to actuate the second plates so as to be approached to or separated from sides of the packing box, respectively; a fixed plate on which the second actuators is disposed; and first actuators configured to move the fixed plates upward or downward and fixed to the box holding frame.

Further, the packing box supposed to withdraw particles in the article withdrawing system of the present disclosure may be provided with an upper surface panel covering the upper surface.

The upper surface panel may be opened prior to being introduced into the article withdrawing system of the present disclosure and then be folded from the upper surface, but may act as an obstacle factor against actuation of the article withdrawing system.

The support unit may be provided with a vacuum suction unit configured to draw the upper surface panel under vacuum in a state where the upper surface panel closing the upper surface of the packing box is unfolded from the upper surface, and that maintains the unfolded state.

As an additional feature of the present disclosure, the article withdrawing system of the present disclosure may be configured such that:

the box holding frame and the article holding frame may be disposed in a position facing each other, and rotation axes of the box holding frame and the article holding frame may be parallel with each other, be disposed at the same height from the ground, and be perpendicular to the movement direction of the linear movement frame relative to the main frame. The rotation axis of the box holding frame and the rotation axis of the article holding frame may overlap each other due to linear movement of the linear movement frame relative to the main frame to form a common rotation axis.

According to this configuration, only by the motion by which the box holding frame is linearly moved relative to the main frame and the motion by which the box holding frame and the article holding frame face each other, the box holding frame and the article holding frame may face each other, and may be rotated and reversed about the same axis.

As an additional feature of the present disclosure, the article withdrawing system of the present disclosure may be configured such that:

up-down movement plates and fourth actuators configured to drive the up-down movement plates to move upward and downward are provided between the holding surfaces of the article holding frame, such that, when the articles fall down from the packing box supported in the box holding frame and are disposed by the article holding frame, the up-down movement plates in an elevated state support the articles and are moved downward.

When the article holding frame and the box holding frame are rotated and reversed together in a state in which the packing box is disposed between the frames while facing each other, the articles fall down from the pacing box supported on the box holding frame toward the holding surface of the article holding frame.

Advantageous Effects

According to the article withdrawing system, an operation of withdrawing the articles from the packing box is automatically conducted, and an operation based on a worker is not required. Thus, the worker is prevented from doing an unreasonable operation due to either a time delay resulting from the worker who withdraws the article that is heavy in weight or repetitive withdrawal of the heavy articles.

Further, the article is prevented from crashing against another object or falling to the ground to suffer damage.

According to the article withdrawing system of the present disclosure, the upper surface panel folded from the packing box is allowed to maintain the unfolded state without being an obstacle against the In a falling process of the article, the article may get an impact caused by a fall in the case where a gap is large between a position of the article at the packing box and a holding surface of an article holding frame. However, according to the article withdrawing system of the present disclosure, an impact caused by a fall does not occur while the article falls from the packing box to the holding surface frame of the article holding frame while the lift plate is contracted in a state in which the lift plate approaches and supports the articles.

DETAILED DESCRIPTION OF THE INVENTION

Hereinafter, as details for implementing the present disclosure, a configuration and an operation of a withdrawing system according to an embodiment of the present disclosure will be described with reference to the accompanying drawings.

Figure 1:
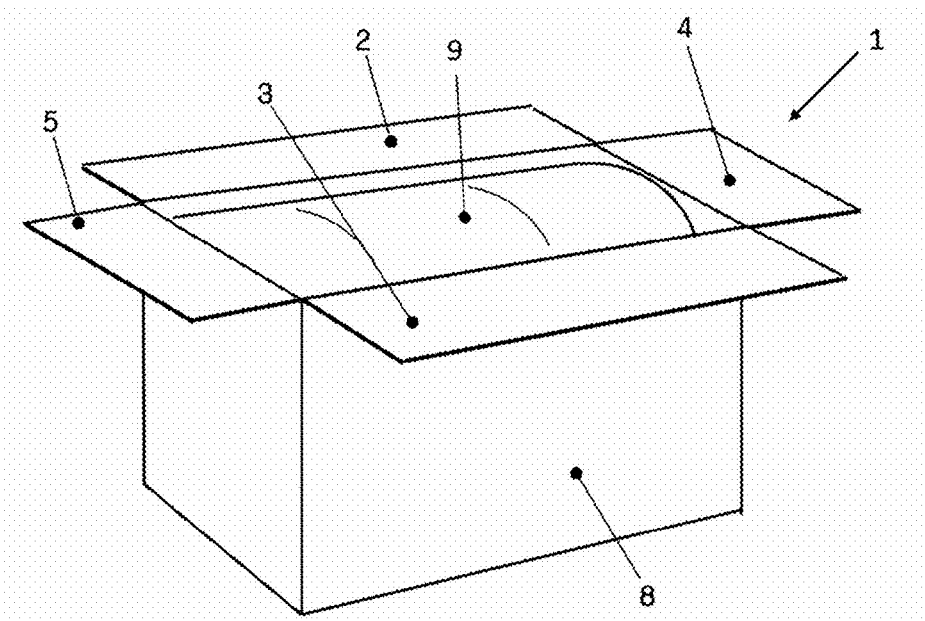
FIG. 1 is a perspective view illustrating a state in which a packing box used in a withdrawing system according to an embodiment of the present disclosure is opened and a film roll is housed.

The withdrawing system according to the present embodiment is configured to withdraw articles from a packing box illustrated in FIG. 1.

Upper surface panels 2 to 5 covering an upper surface of the packing box 1 are all open and unfolded, and a film roll 9 rolled in a cylindrical shape is contained as an article to be withdrawn by the withdrawing system according to the present embodiment in a space of an inner portion of the packing box.

The film roll 9 takes the form of a roll around which a film is wound, and has a weight of a high level. Some components of the withdrawing system according to the present embodiment are configured to be suitable to withdraw the film roll 9, but the article withdrawn through the withdrawing system according to the present embodiment is not limited to the film roll, and thus includes all articles which are held in the packing box 1 and may depart from the packing box 1 by reverse of the packing box 1.

Figure 2:
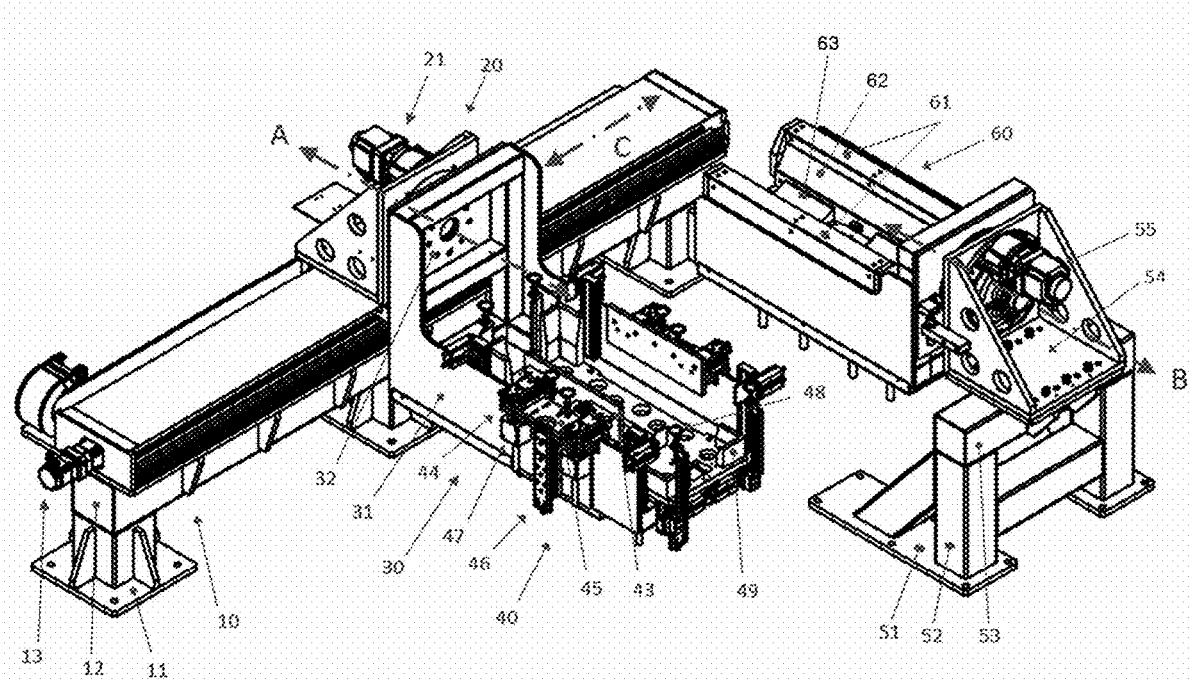
FIGS. 2 and 3 are a perspective view and a top view illustrating an overall configuration of the withdrawing system according to an embodiment of the present disclosure.
Figure 3:
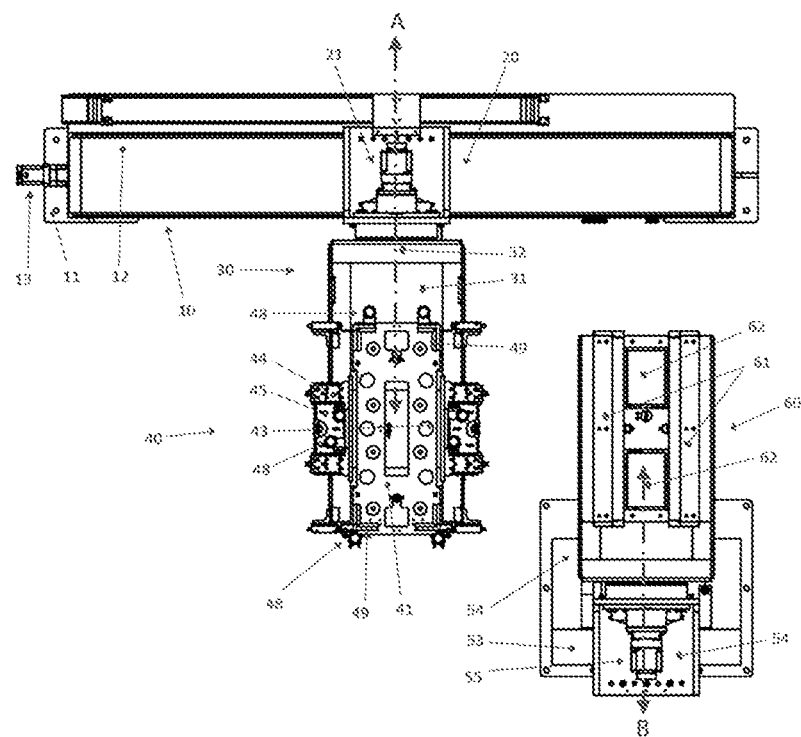

The withdrawing system according to the embodiment of the present disclosure is illustrated in FIGS. 2 and 3. The configuration of the withdrawing system of the present disclosure will be described with reference to these figures.

When roughly classified, the withdrawing system of the present disclosure is made up of first stages 10 to 40 that reverse the packing box 1 so as to hold the packing box 1 carried in a state in which an upper surface of the packing box 1 is opened, and second stages 50 and 60 that support and hold the film roll 9 falling from the first stage 20.

As the first stages 10 to 40, there are provided a main frame 10 that is placed and supported on the ground, and extends at a long length to be placed on and fixed to the ground, a linear movement frame 20 that is moved on the main frame 10 in a lengthwise direction C of the main frame 10, a box holding frame 30 that is rotatably coupled to the linear movement frame 20, and a support unit 40 that is installed on the box holding frame 30 and supports a bottom and sides of the packing box 1.

As the second stages 50 and 60, there are provided a fixed frame 50 that is placed and supported on the ground, and an article holding frame 60 that is rotatably coupled to the fixed frame 50.

The article holding frame 60 is provided with a pair of holding plates 62 that are placed apart from each other in a diameter direction of the film roll 9 with a concave curved surface as a holding surface that is complementary to a cylindrical shape of the film roll 9 so as to contain the film roll 9 falling from the packing box 1 supported on the support unit 40 among the first stages 10 to 40.

First, configurations of the first stages will be specifically described.

The main frame 10 among the first stages 10 to 40 is configured in such a way that a plurality of props 11 placed on the ground is disposed vertically, and a box-shaped cross beam 12 extending to be long is integrally formed with the props 11, and is placed at upper ends of the props 11.

A screw feed unit is embedded at each of upper surfaces of the props 11, and the linear movement frame 20 is meshed with a screw 13 of the screw feed unit so as to linearly move in the lengthwise direction of the main frame 10 according to rotation of the screw 13.

The linear movement frame 20 is configured in the shape of a box, upper and rear surfaces of which are opened, and is placed apart from the upper surface of the main frame 10, and a first drive motor 21 as a rotation driving means for rotating the box holding frame 30 is fixedly coupled inside the linear movement frame 20. The first drive motor 21 is made up of a servo motor in which a rotational angle is controlled, and a reducer that reduces output of the servo motor, and a rotational shaft of the first drive motor 21 refers to an output shaft of the reducer.

The box holding frame 30 is fixed to the rotational shaft of the first drive motor 21, and is rotated according to rotation of the first drive motor 21.

Figure 4:
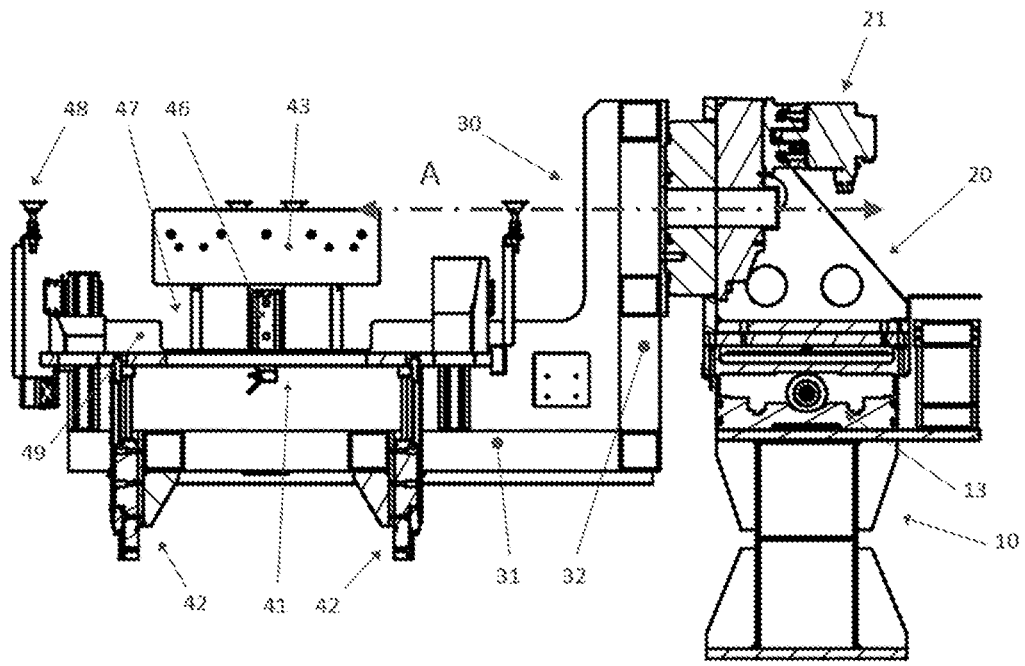
FIGS. 4 and 5 are each longitudinal sectional views illustrating first and second stages that constitute the withdrawing system according to an embodiment of the present disclosure.

The following description will be made along with FIG. 4 that illustrates longitudinal cross-sectional views of the first stages 10 to 40.

The box holding frame 30 is made up of a first portion 31 which holds the packing box 1, on which the support unit is mounted, which extends along a rotation axis A of the box holding frame 30, and has the form of a box in which an upper surface and one side are opened, and a second portion 32 which vertically extends upward from the portion of the box form, and is coupled to the first drive motor 21.

In the support unit 40 among the first stages 10 to 40, a first plate 41, in which the lower surface of the packing box 1 is placed, is disposed on the lower surface of a first portion 31 of the box holding frame 30, and two first actuators 42, which actuate the first plate 41 upward and downward, are fixed to a side of the first portion 31 of the box holding frame 30.

Two second plates 43, which respectively pressurize the opposite sides of the packing box 1 at opposite sides of the rotation axis A of the box holding frame 30, are disposed on upper sides of sidewalls (32 in FIG. 4) of the box holding frame 30, respectively. Provided are second actuators 44 which are disposed on one of the second plates 43 in parallel by twos, and which actuate the second plates 43 so as to be approximate to and be separated from the sides of the packing box 1, and the second actuators 44 are fixed to fixed plates that are disposed horizontally.

Third actuators 46 that actuate the fixed plates 45 upward and downward in an up-down direction and are fixed to the box holding frame 30, and a pair of linear guides 47 that guide upward and downward actuations of the fixed plates 45 and are disposed in parallel with the third actuators 46 are fixed to the first portion 31 of the box holding frame 30.

A support plate 49, which surrounds corners of the lower surface of the packing box 1 at four corners thereof, is disposed on the first plate 41.

According to this configuration, the first plate 41 is placed on the lower surface of the first portion 31 of the box holding frame 30, supports the lower surface of the packing box 1, is actuated upward and downward by the actuation of the first actuators 42, and moves the packing box 1 upward and downward.

The pair of second plates 43 are respectively disposed to abut opposite sides 5 of the packing box 1, and are supported or separated by stretching and contracting of the second actuators 44.

The fixed plates 45, at which the second plates 43 and the second actuators 44 are disposed, are moved upward and downward by the third actuators 46, but are synchronized with the upward and downward actuations of the first plate 41 to move the packing box 1 upward and downward.

In the present embodiment, the first, second and third actuators 42, 44 and 46 are all configured of a pneumatic cylinder and conduct stretch and contraction. However, these actuators are not necessarily the pneumatic cylinders, and anything may be used if they are elements performing telescopic linear actuation.

Vacuum suction units 48 are disposed upward at the fixed plates 45 and the first plate 41, respectively. Positions at which the vacuum suction units 48 are disposed are positions at which the upper surface panels 3 and 4 unfolded from the upper surface of the packing box 1 when the packing box 1 is placed are placed at the first portion 31 of the box holding frame 30.

When the box holding frame 30 among the first stages to 40 and the article holding frame 60 of the second stages 50 and 60 face each other to reverse the packing box 1, the upper surface panels 3 and 4 of the packing box 1 are placed between the box holding frame 30 and the article holding frame 60 so as not to become an obstacle against the actuation of the machine, the vacuum suction units 48 draw (or attract) upper surface panels 3 and 4 of the packing box 1 respectively, and allow the upper surface panels 3 and 4 to maintain the unfolded state.

Figure 5:
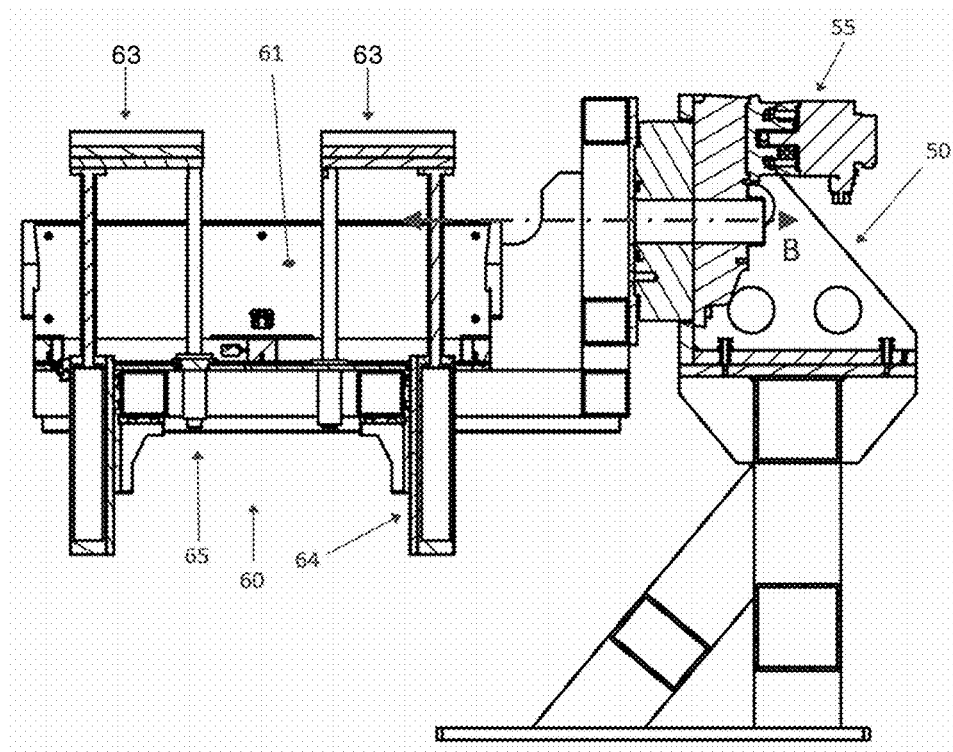

The configurations of the second stages 50 and 60 will be described with reference to FIG. 5 together with FIGS. 2 and 3 that are the longitudinal cross-section views of the second stages 50 and 60.

As the fixed frame 50 of the second stages 50 and 60, props 52 that extend perpendicular to a bottom plate 51 placed on the ground, and a cross beam 53 that is placed at upper ends of the props are provided. A box-shaped motor fixed frame 54 is attached on the cross beam 53, and a second drive motor 55 acting as a rotation driving means is provided on an inner side of the motor fixed frame 54.

The second drive motor 55 is also made up of a servo motor, the rotational angle of which is controlled, and a speed reducer, and a rotational shaft of the second drive motor 55 also refers to an output shaft of the speed reducer.

The article holding frame 60 is configured in the form of a box in which an upper surface and one side are opened, and a side opposite to the opened one side is coupled to the rotational shaft of the second drive motor 55.

The article holding frame 60 is provide with sidewalls 61 on the opposite sides of the rotation axis B in the diameter direction, and a pair of holding plates 62, which have a concave curved surface that is complementary to a cylindrical shape of the film roll 9, are provided from upper ends of the sidewalls 61 to the inner side of the article holding frame 60 in the diameter direction.

A pair of up-down movement plates 63, fourth actuators 64 moving the respective up-down movement plates 63 upward and downward, and linear guides 65 guiding the up-down movements of the up-down movement plates 63 are provided between the holding plates 62 and on a lower surface of the article holding frame 60.

The up-down movement plates 63 support the film roll 9, and move upward or downward to allow the film roll 9 to rest on the holding plates 62 of the article holding frame 60 without getting a shock while being moved downward when the film roll 9 is moved upward or downward by the fourth actuators 64 and falls from the box holding frame 30 among the first stages 10 to 40 to the article holding frame 60 among the second stages 50 and 60.

Meanwhile, the rotation axis A of the box holding frame among the first stages 10 to 40 and the rotation axis B of the article holding frame 60 among the second stages 50 and 60 is parallel with each other, and the box holding frame is linearly moved between a position on a plane by the linear movement of the linear movement frame 20 and a position separated from a position overlapped with the article holding frame.

Due to the rotation caused by the first drive motor 21, the box holding frame 30 is rotatable relative to the article holding frame 60 between a position located below and a position located above in the up-down direction.

An operation of the withdrawing system according to the present embodiment having the aforementioned configuration will be described.

FIGS. 2 and 3 illustrate an initial state of the withdrawing system. In this state, the article holding frame of the first stages is in a state in which a position thereof does not overlap with that of the article holding frame 60 of the second stages 50 and 60 on a plan, and the first portion 31 is disposed below with respect to the rotation axis A of the box holding frame 30 so as to allow the packing box to be disposed on the article holding frame 60.

Figure 6:
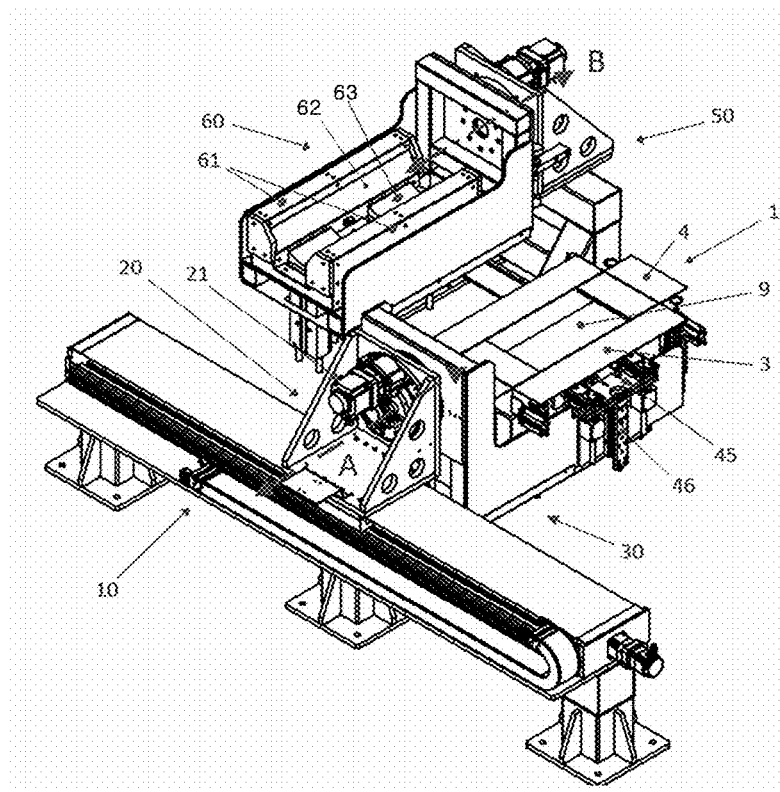
FIGS. 6 to 9 are perspective views illustrating operations of the withdrawing system according to an embodiment of the present disclosure in order.

FIG. 6 illustrates a state in which the packing box is introduced into the withdrawing system according to the present embodiment.

In this state, the packing box 1 is disposed and supported on the first plate 41 of the support unit 40 attached to the box holding frame 30 among the first stages to 40 by a carrying robot or another carry unit. The support plate 49, which is installed to corners of the first plate 41, functions to support the packing box 1 such that the packing box 1 is not moved on the horizontal plane.

Further, the second plates 43 of the support unit 40 move toward the packing box 1 to abut and support the sides 8 of the packing box 1 due to stretching of the second actuators 44, and the vacuum suction units 48 disposed on the first plate 41 and the fixed plates 45 draw the respective upper surface panels 3 and 4 of the opened and unfolded packing box 1, and fix the upper surface panels 3 and 4 of the packing box 1 in place.

Figure 7:
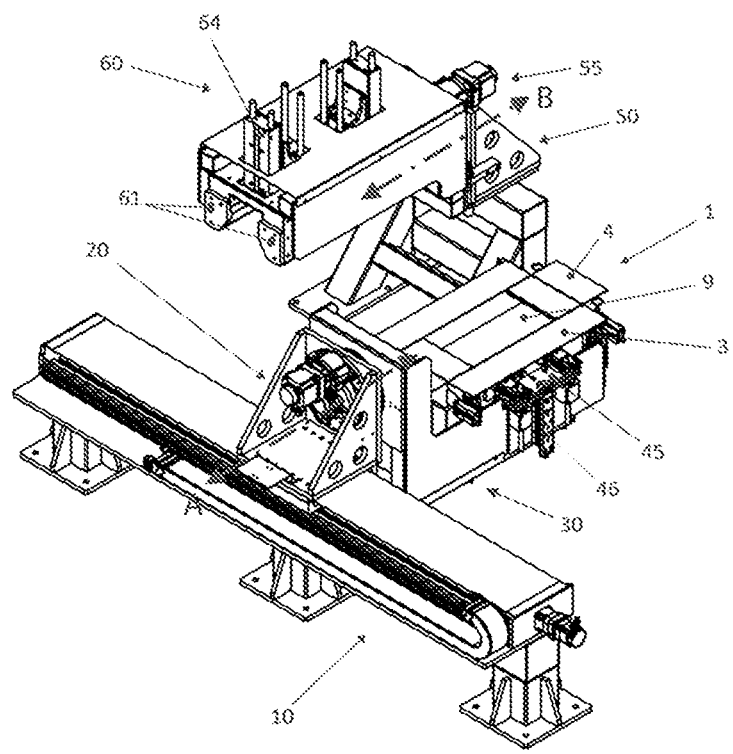

FIG. 7 illustrates a preparing step of withdrawing the film roll from the packing box.

In a state in which the packing box 1 is rested in the article holding frame 30, the linear movement frame 20 is linearly moved along the main frame 10, and the box holding frame 30 is moved in the lengthwise direction of the main frame 10. The rotation axis A of the box holding frame 30 and the rotation axis B of the article holding frame 60 overlap with each other, and both have a common rotation axis.

Accordingly, in the state illustrated in FIG. 7, the box holding frame 30 among the first stages 10 to 40 is disposed below the article holding frame 60 of the second stages 50 and 60, and the article holding frame 60 is rotated at 180 degrees and faces the packing box 1 disposed in the box holding frame 30 in which the holding plates 62 and up-down movement plate 63 are disposed below.

Figure 8:
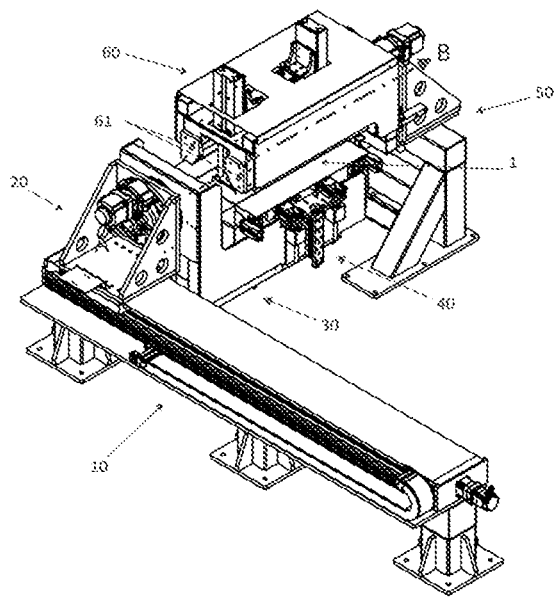

FIG. 8 illustrates a step of supporting the packing box 1 between the box holding frame 30 and the article holding frame 60.

In this step, the support unit 40 disposed in the article holding frame 30 is actuated.

The first plate 41 supporting the lower surface of the packing box 1 and the fixed plates 45 to which the second plates 43 supporting the side of the packing box 1 are coupled are moved upward by the first actuators 42 and the third actuator 46, respectively. Thereby, the packing box 1 is moved toward the article holding frame 60. The up-down movement plate 63 disposed on the lower surface of the article holding frame 60 is moved downward by stretching operation of the fourth actuators 64.

Accordingly, the packing box 1 is disposed between the box holding frame 30 and the article holding frame 60.

Figure 9:
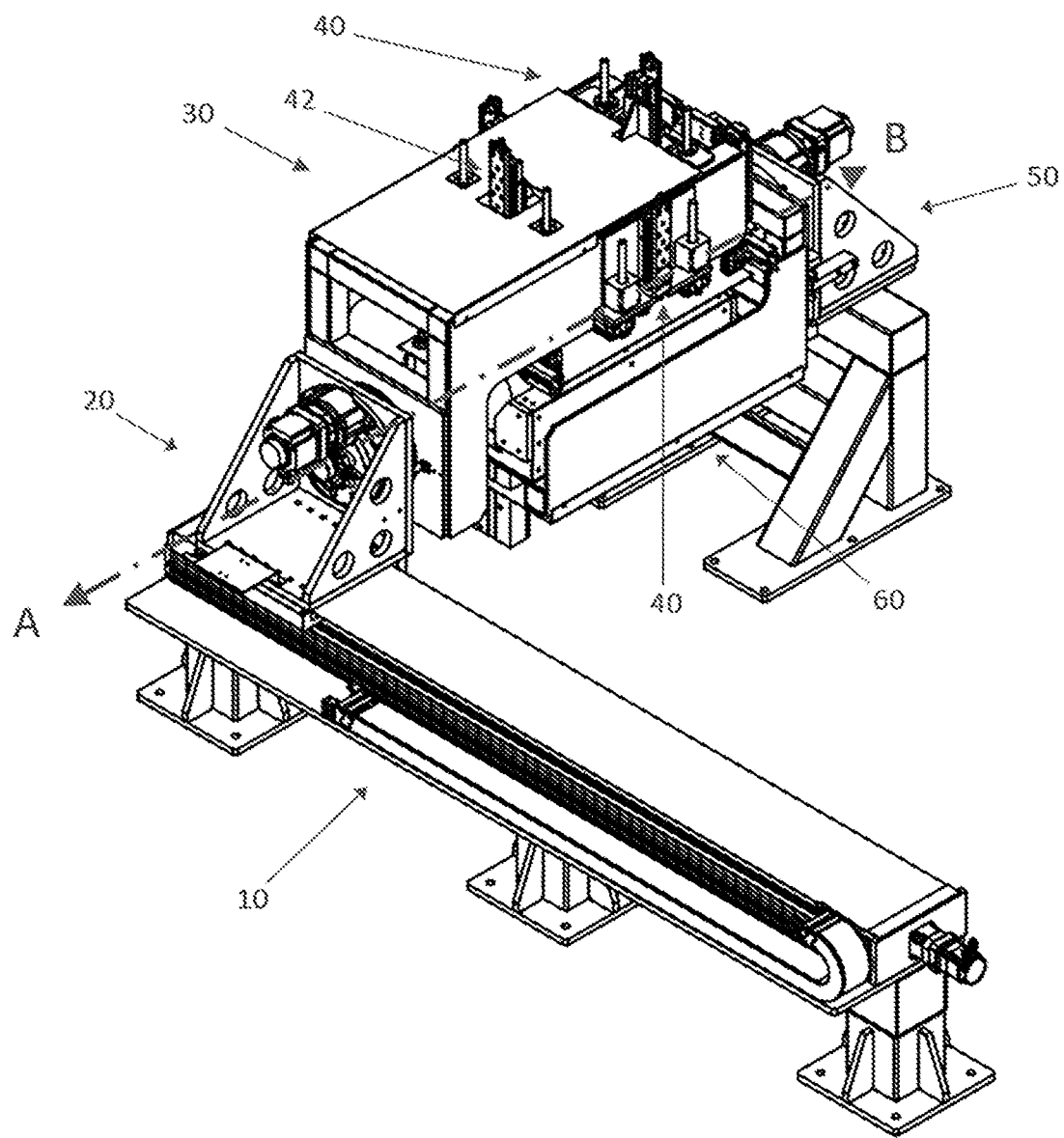

FIG. 9 illustrates reversed states of the article holding frame 60 and the box holding frame 30.

The box holding frame 30 and the article holding frame 60 are rotated together in one direction at an angle of 180 degrees with respect to the common rotation axes A and B, so that the article holding frame 60 is disposed below the box holding frame 30.

Accordingly, the film roll 9 that has been held in the packing box 1 supported on the box holding frame 30 is supported on the holding plates 62 and the up-down movement plates 63 of the article holding frame 60 of the second stages 50 and 60

In an early stage, the film roll 9 is supported by the up-down movement plate 63, and is supported and rested by the up-down movement plate 63 while the fourth actuators 64 are being contracted.

Next, the support unit 40 on the first stages conducts contraction actuation, and the packing box 1 is separated from the article holding frame 60 holding the film roll 9. To be specific, the first plate 41 and the fixed plates 45 conduct backward movement operation, so that the packing box 1 comes into close contact with the first portion 31 of the box holding frame 30, and is separated from the article holding frame 60.

Consequently, the film roll 9 held in the packing box 1 is discharged from the packing box 1, and is held in the article holding frame 60.

Subsequently, the linear movement frame 20 among the first stages 10 to 40 is linearly moved along the main frame 10, and the box holding frame 30 is separated from the article holding frame 60 of the second stages 50 and 60, is again rotated relative to the linear movement frame 20 at an angle of 180 degrees, and returns to the initial state.

Only the empty packing box 1 is left on the box holding frame 30 among the first stages 10 to 40, and the film roll 9 is left on the article holding frame 60 of the second stages 50 and 60.

The packing box 1 and the film roll 9 are carried from the box holding frame 30 and the article holding frame 60 by a robot or another carrying unit, respectively.

This operation is repeated, and an operation of withdrawing the film roll 9 from the packing box 1 is continuously and automatically preformed.

Hereinabove, the configuration and the operation of the withdrawing system for withdrawing articles held in a packing box have been described, but the present disclosure is not limited to the foregoing embodiments, and various deformations and additions of elements are possible within a scope defined in the claims.

The invention claimed is:

1. An article withdrawing system for withdrawing articles held in a packing box, an upper surface of which is opened, the article withdrawing system comprising:
 a first stage configured to reverse a packing box so as to hold the packing box carried with an upper surface opened and to enable the articles held in the packing box to fall down; and
 a second stage configured to support and hold the articles falling down from the first stage,
 wherein the first stage comprises a support unit configured to support the packing box and move the packing box upward or downward, a box holding frame on which the support unit is mounted, a linear movement frame to which the box holding frame is rotatably coupled, a main frame located and supported on a ground, with the linear movement frame being coupled to and supported on the main frame so as to be linearly moved, and a first rotation driving means disposed in the linear movement frames frame and for rotatably driving the box holding frame,
 wherein the second stage comprises an article holding frame having a holding surface of a shape complementary to a shape of the article so as to hold the articles falling down from the first stage, a fixed frame located and supported on the ground, with the article holding frame being rotatably coupled to the fixed frame, and a second rotation driving means for rotating the article holding frame relative to the fixed frame,
 wherein when the packing box in which the articles are held is rested on the support unit of the first stage, the article holding frame of the second stage is rotated relative to the fixed frame such that the holding surface faces downward,
 wherein after the linear movement frame of the first stage is linearly moved along the main frame such that the opened upper surface of the packing box faces the holding surface of the article holding frame of the second stage, the packing box is moved upward by the support unit such that the upper surface of the packing box approximates to or abuts the holding surface, and wherein the box holding frame of the first stage and the article holding frame of the second stage are respectively rotated relative to the linear movement frame and the main frame in a state in which the upper surface of the packing box approximates to or abuts the holding surface, so that a position of the packing box is reversed and the articles held in the packing box fall down and are held in the article holding frame.

2. The article withdrawing system according to claim 1, wherein the support unit of the first stage comprises a first plate supporting a lower surface of the packing box, a first actuator configured to actuate the first plate in an upward or downward direction, a plurality of second plates abutting opposite sides of the packing box on the opposite sides of a rotation axis of the box holding frame, second actuators configured to actuate the second plate to be separated relative to the sides of the packing box, fixed plates on which the second actuators are disposed, and third actuators fixed to the box holding frame and configured to actuate the fixed plates to move the fixed plates upward or downward in a vertical direction.

3. The article withdrawing system of claim 2, wherein the support unit is provided with vacuum suction units configured to draw upper surface panels closing the upper surface of the packing box under vacuum so as to allow the upper surface panels to be maintained in an unfolded state in a state in which the upper surface panels are unfolded from the upper surface.

4. The article withdrawing system of claim 1, wherein the box holding frame and the article holding frame are disposed in a position facing each other, and
wherein rotation axes of the box holding frame and the article holding frame are parallel with each other, are disposed at a same height from the ground, and are perpendicular to a movement direction of the linear movement frame relative to the main frame, and a rotation axis of the box holding frame and the rotation axis of the article holding frame overlap each other due to linear movement of the linear movement frame relative to the main frame to form a common rotation axis.

5. The article withdrawing system of claim 1, wherein up-down movement plates configured to move upward or downward and fourth actuators configured to drive the up-down movement plates to move upward or downward are provided between the holding surface of the article holding frame, such that, when the articles fall down from the packing box supported in the box holding frame and are disposed by the article holding frame, the up-down movement plates in an elevated state support the articles and are moved downward.

* * * * *